(12) United States Patent
Kim et al.

(10) Patent No.: US 12,498,124 B2
(45) Date of Patent: Dec. 16, 2025

(54) AIR CONDITIONER PIPING SYSTEM AND METHOD OF PRODUCING THE SAME

(71) Applicant: HS R&A Co., Ltd., Gyeongsangnam-do (KR)

(72) Inventors: Young Jun Kim, Gyeongsangnam-do (KR); Deok Hyun Lim, Gyeongsangnam-do (KR); Un Bae Kim, Busan (KR); Jae Won Sim, Gyeongsangnam-do (KR)

(73) Assignee: HS R & A CO., LTD., Yangsan-si (KR)

( * ) Notice: Subject to any disclaimer, the term of this patent is extended or adjusted under 35 U.S.C. 154(b) by 501 days.

(21) Appl. No.: 17/994,125

(22) Filed: Nov. 25, 2022

(65) Prior Publication Data
US 2023/0167985 A1   Jun. 1, 2023

(30) Foreign Application Priority Data

Nov. 26, 2021   (KR) .................. 10-2021-0165099

(51) Int. Cl.
F24F 1/26 (2011.01)
F25B 41/40 (2021.01)

(52) U.S. Cl.
CPC .............. *F24F 1/26* (2013.01); *F25B 41/40* (2021.01); *F25B 2345/006* (2013.01)

(58) Field of Classification Search
CPC ....... F16L 41/082; F16L 41/08; F16L 41/021; F16L 47/28; F25B 2345/006; F24F 1/26; B29C 66/71; B29C 65/16
See application file for complete search history.

(56) References Cited

U.S. PATENT DOCUMENTS

| 8,360,476 B2 * | 1/2013 | Barden ................. F16L 47/28 285/124.2 |
| 11,840,124 B2 * | 12/2023 | Choi ..................... F16L 47/28 |
| 2011/0265978 A1 | 11/2011 | Zanardi et al. |

(Continued)

FOREIGN PATENT DOCUMENTS

| JP | 2020-019247 A | 2/2020 |
| KR | 10-1510160 B1 | 4/2015 |

(Continued)

OTHER PUBLICATIONS

Office Action dated Sep. 19, 2023 (11 pages including English translation) out of Korean counterpart patent application 10-2021-0165099.

(Continued)

*Primary Examiner* — David Bochna
(74) *Attorney, Agent, or Firm* — Crowell & Moring LLP; John C. Freeman

(57) ABSTRACT

An air conditioning piping system of the disclosure includes a refrigerant pipe made of a plastic material and configured to provide a fluid flow between components constituting an air conditioning system; at least one connection flange made of the plastic material and configured to provide a connection between the refrigerant pipe and components constituting the air conditioner system; and at least one charging port made of the plastic material and having a charging valve configured to inject a refrigerant into the refrigerant pipe.

10 Claims, 8 Drawing Sheets

(56) References Cited

U.S. PATENT DOCUMENTS

| | | | | |
|---|---|---|---|---|
| 2015/0028581 A1* | 1/2015 | Raible | ................. | F16L 47/30 |
| | | | | 277/626 |
| 2015/0211662 A1* | 7/2015 | Corcoran | .............. | F16L 41/082 |
| | | | | 285/200 |
| 2017/0097113 A1* | 4/2017 | Gresset | ................. | F16L 47/30 |
| 2020/0254712 A1* | 8/2020 | Tsuboi | ................. | F16L 11/04 |
| 2021/0316592 A1* | 10/2021 | Park | ...................... | F16L 47/02 |

FOREIGN PATENT DOCUMENTS

| | | |
|---|---|---|
| KR | 10-2020-0061375 A | 6/2020 |
| KR | 10-2021-0125669 A | 10/2021 |

OTHER PUBLICATIONS

Extended European Search Report dated Apr. 6, 2023 (8 pages) out of corresponding European Application No. 22203452.2.

* cited by examiner

AIR CONDITIONER PIPING SYSTEM AND METHOD OF PRODUCING THE SAME

This application is based on and claims priority under 35 U.S.C. § 119 to Korean Patent Application No. 10-2021-0165099, filed on Nov. 26, 2021, in the Korean Intellectual Property Office, the entire disclosure of which is herein incorporated by reference.

BACKGROUND OF THE INVENTION

Field of the Invention

The disclosure relates to an air conditioner piping system and a method of producing the same, and more particularly, to an air conditioner piping system and a method of producing the same capable of providing a light weight and vibration isolation effect as well as minimizing a pressure loss of a refrigerant fluid by producing a refrigerant pipe, which is an air conditioner pipe of a vehicle, and a connection flange and a charging port coupled to the refrigerant pipe with a plastic material, and connecting the refrigerant pipe, the connection flange, and the charging port through laser welding.

Description of Related Art

In general, a refrigeration cycle for operating an air conditioner for a vehicle is made by circulating a refrigerant through a compressor, a condenser, an expansion valve, and an evaporator.

To this end, the compressor, the condenser, the expansion valve, and the evaporator are sequentially connected by a refrigerant pipe and a flange constituting an air conditioner piping system to form one refrigerant circulation circuit.

The refrigerant pipe and the flange constituting the conventional air conditioner piping system are produced using a metal material, such as aluminum, and are connected using a caulking method, a brazing method, and a soldering method.

For reference, the caulking method refers to a method of press-fitting the refrigerant pipe into a fastening hole of a flange after forming that expands or reduces the refrigerant pipe, and the brazing method and the soldering method refer to a method of enabling a base material and a base material to be metal-bonded to each other by melting only a filler material, such as a lead, between the base material and the base material (between the refrigerant pipe and the flange).

The refrigerant pipe is equipped with a charging valve, which is a component for charging, replenishing, or withdrawing a refrigerant. The charging valve is provided inside a charging port made of a metal material, such as aluminum, and is mounted in the refrigerant pipe through the charging port.

In this case, a fixing part for fixing the charging port in a state of being inserted into the refrigerant pipe is formed in a lower part of the charging port, and the charging port and the refrigerant pipe are coupled to each other through welding in a state in which the fixing part is inserted in the refrigerant pipe.

However, the conventional air conditioning piping system has the following problems.

First, as a refrigerant pipe is made of an aluminum material, the refrigerant pipe is vulnerable to a vehicle driving vibration and an engine vibration, and a local part of the refrigerant pipe is covered with a vibration isolation hose, and accordingly, there is a problem that a structure of an air conditioner piping system becomes complicated and that a cost increases due to the increase of the number of components.

Second, due to an impact when the refrigerant pipe, the connection flange, and the charging port are connected by a caulking method or a brazing method, a diameter of an end portion (a portion fastened with the flange) of the refrigerant pipe is deformed or a step occurs; thus, a diameter of the entire length of the refrigerant pipe is not constant, whereby there is a problem that a pressure loss of a refrigerant fluid flowing inside the refrigerant pipe occurs.

Third, when brazing welding the refrigerant pipe, the connection flange, and the charging port, in the case that an impact of brazing welding is excessively transmitted to the refrigerant pipe or a temperature of brazing welding exceeds an appropriate temperature for brazing welding, there is a problem that a quality defect occurs such as unexpectedly damage or puncture of the refrigerant pipe.

Patent Document

Korean Patent Publication No. 10-1510160

SUMMARY

The disclosure has been devised to solve the conventional problems as described above, and the disclosure provides an air conditioner piping system and a method of producing the same capable of minimizing a pressure loss of a refrigerant fluid by maintaining a diameter of the entire length of a refrigerant pipe at the same diameter while providing light weight and vibration isolation effects by producing the refrigerant pipe and a connection flange and a charging port coupled to the refrigerant pipe with a plastic material having a vibration isolation effect, and connecting the refrigerant pipe, the connection flange, and the charging port through laser welding that can prevent damage between the refrigerant pipe, the connection flange, and the charging port of a plastic material.

According to an embodiment of the disclosure, an air conditioning piping system includes a refrigerant pipe made of a plastic material and configured to provide a fluid flow between components constituting an air conditioning system; at least one connection flange made of the plastic material and configured to provide a connection between the refrigerant pipe and components constituting the air conditioner system; and at least one charging port made of the plastic material and having a charging valve configured to inject a refrigerant into the refrigerant pipe, wherein the connection flange is bonded to the refrigerant pipe by laser welding in a state in which one side end portion of the refrigerant pipe is coupled, and the charging port is bonded to the refrigerant pipe by laser welding in a state seated at the upper side of an outer circumferential surface of the refrigerant pipe, the charging port includes a main body in which the charging valve configured to inject the refrigerant into a refrigerant injection hole formed in the refrigerant pipe is disposed; and a fixing part extended to the lower end side of the main body to couple the main body to the outer circumferential surface of the refrigerant pipe, and the fixing part is configured to be coupled to the refrigerant pipe except for a portion of the lower side of the outer circumferential surface of the refrigerant pipe, and when the fixing part is coupled to the outer circumferential surface of the refrigerant pipe, a thickness thereof is configured to decrease from the upper end side to the lower end side so as to flexibly generate an elastic restoring force.

According to an embodiment of the disclosure, a method of producing an air conditioner piping system includes a component producing step of producing each of a refrigerant pipe, a connection flange, and a charging port using a plastic material; a first bonding step of coupling the connection flange to at least one end side of the refrigerant pipe and then bonding the refrigerant pipe and the connection flange to each other by laser welding using a laser device; a hole forming step of forming a refrigerant injection hole on an outer circumferential surface of the refrigerant pipe using a drilling device; and second bonding step of coupling a fixing part of the charging port at a position in which the refrigerant injection hole of the refrigerant pipe is formed, and then bonding the refrigerant pipe and the connection flange to each other by the laser welding using the laser device.

BRIEF DESCRIPTION OF THE DRAWINGS

In the drawings, the same or similar reference numerals may be used for the same or similar components.

DETAILED DESCRIPTION

Figure 1:
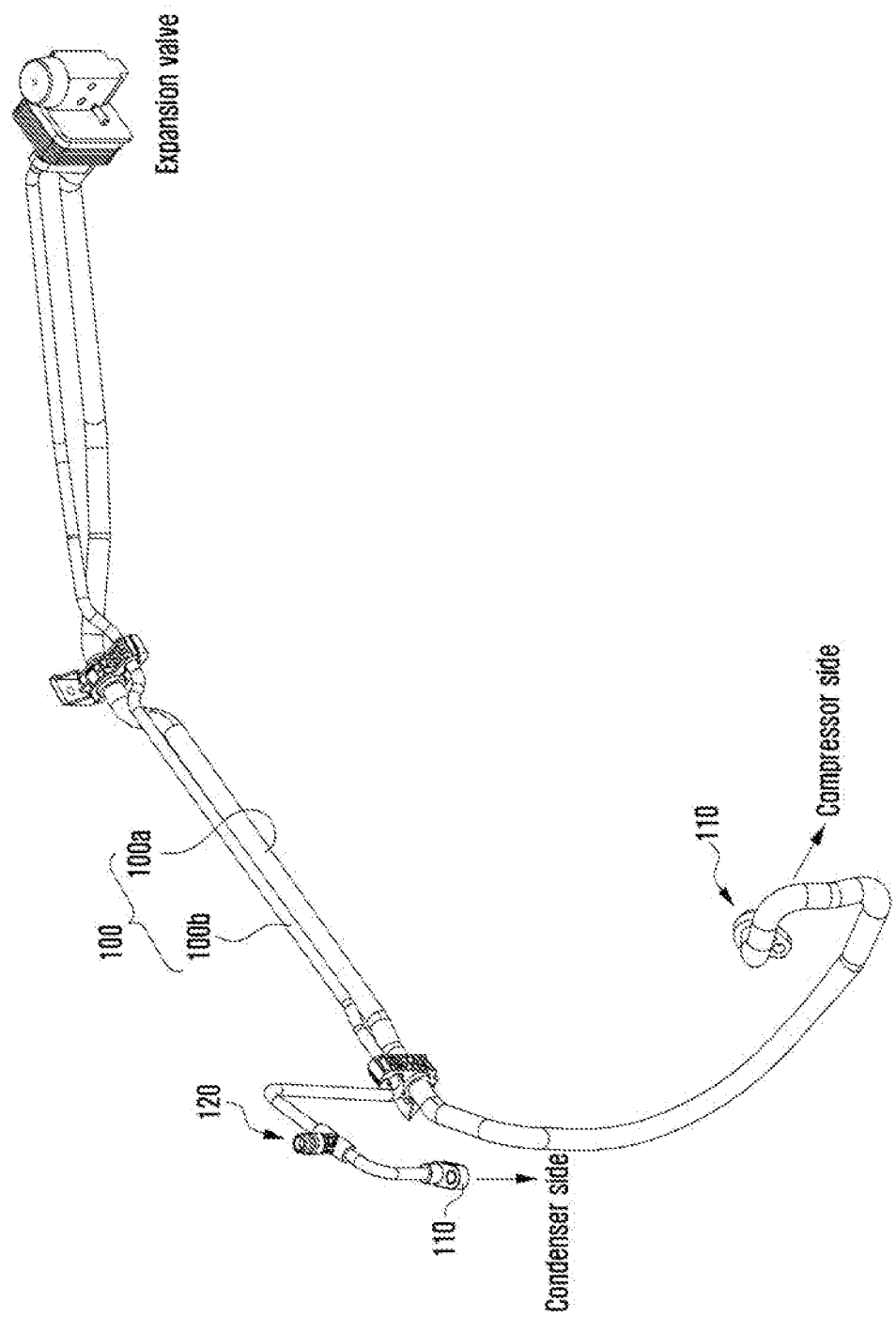
FIG. 1 is a perspective view schematically illustrating an air conditioner piping system according to an embodiment of the disclosure.

Hereinafter, preferred embodiments of the disclosure will be described in detail with reference to the accompanying drawings. In this case, it should be noted that in the accompanying drawings, the same components are denoted by the same reference numerals, if possible. Further, detailed descriptions of well-known functions and configurations that may obscure the subject matter of the disclosure will be omitted.

Hereinafter, an embodiment of the disclosure will be described with reference to the attached FIGS. 1 to 6.

Figure 2:
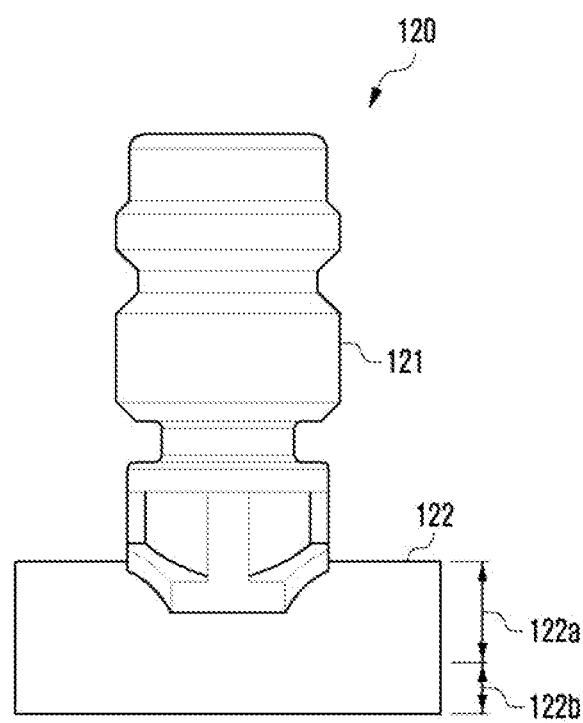
FIG. 2 is a front view illustrating a structure of a charging port according to an embodiment of the disclosure.
Figure 3:
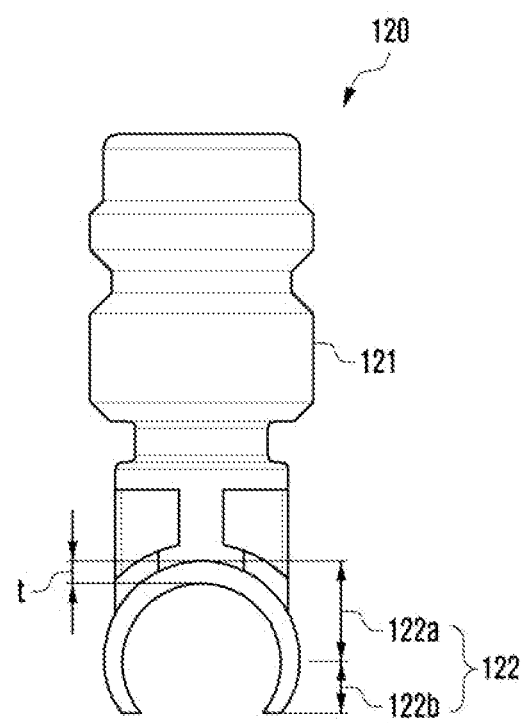
FIG. 3 is a side view illustrating a structure of a charging port according to an embodiment of the disclosure.

FIG. 1 is a perspective view schematically illustrating an air conditioner piping system according to an embodiment of the disclosure, FIG. 2 is a front view illustrating a structure of a charging port according to an embodiment of the disclosure, and FIG. 3 is a side view illustrating a structure of a charging port according to an embodiment of the disclosure.

Figure 4:
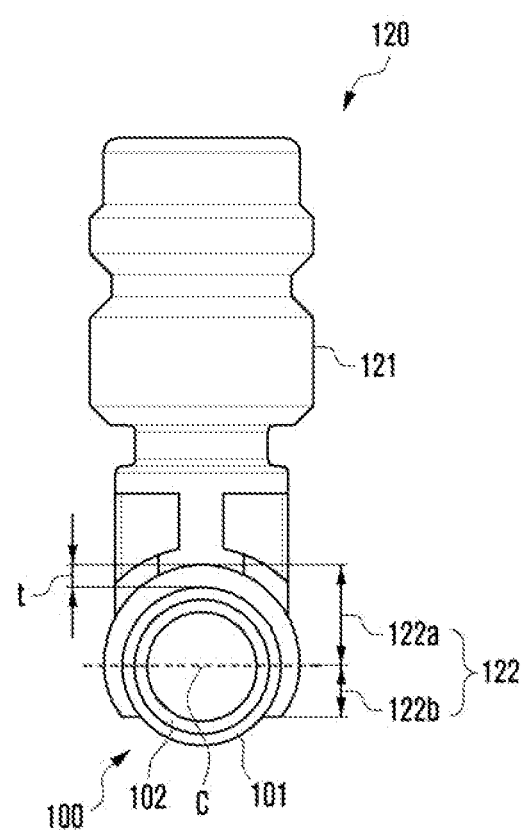
FIG. 4 is a side view illustrating a state in which a refrigerant pipe and a charging port are bonded according to an embodiment of the disclosure.
Figure 5:
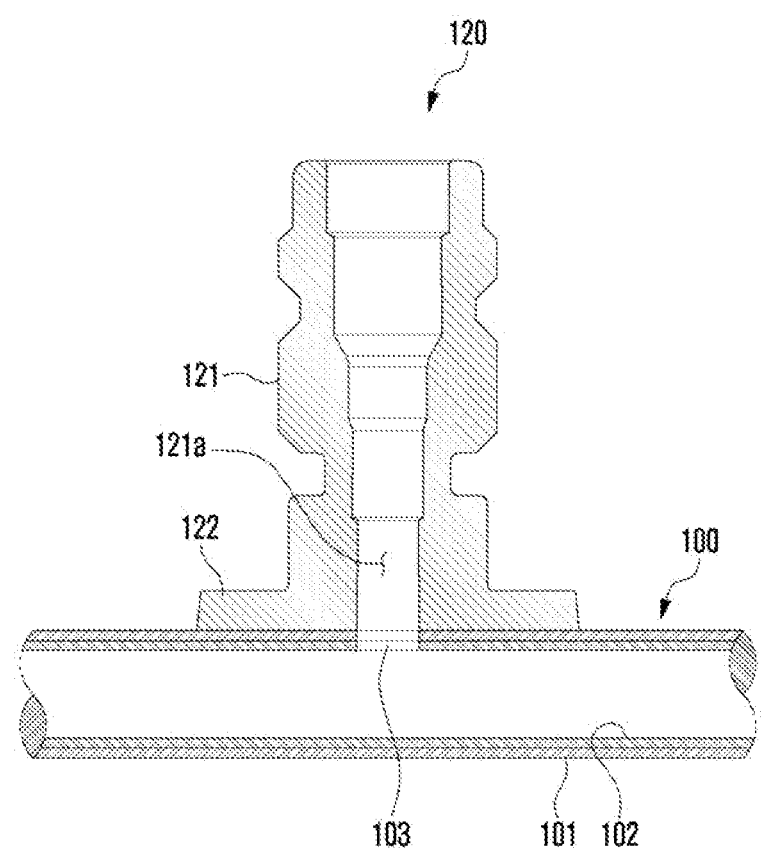
FIG. 5 is a cross-sectional view illustrating a state in which a refrigerant pipe and a charging port are bonded according to an embodiment of the disclosure.
Figure 6:
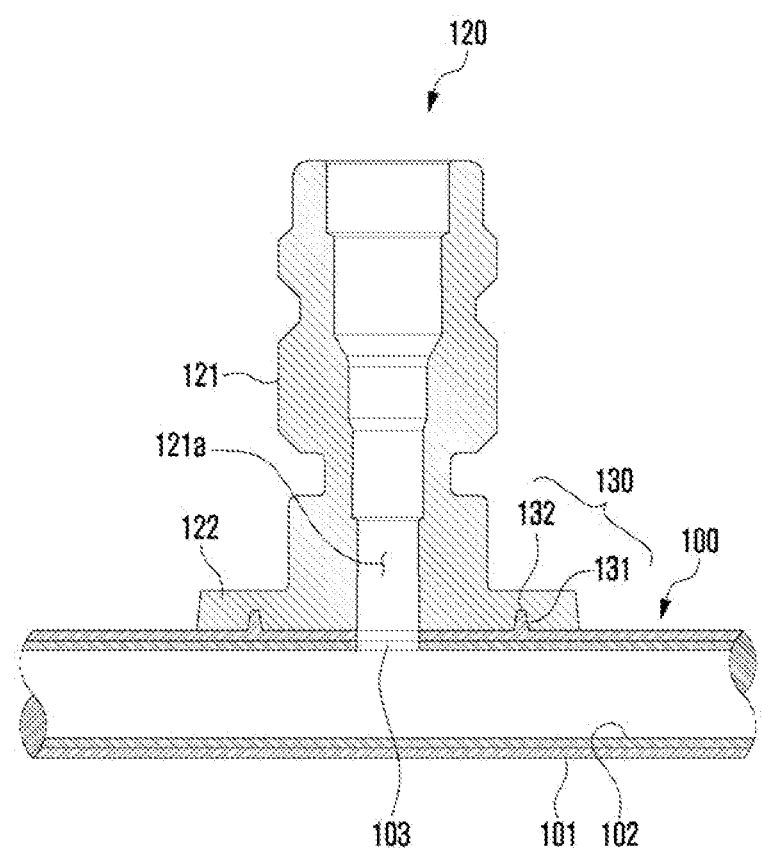
FIG. 6 is a cross-section view illustrating a state in which a charging port and a refrigerant pipe are coupled by a positioning means according to an embodiment of the disclosure.

FIG. 4 is a side view illustrating a state in which a refrigerant pipe and a charging port are bonded according to an embodiment of the disclosure, FIG. 5 is a cross-sectional view illustrating a state in which a refrigerant pipe and a charging port are bonded according to an embodiment of the disclosure, and FIG. 6 is a cross-section view illustrating a state in which a charging port and a refrigerant pipe are coupled by a positioning means according to an embodiment of the disclosure.

With reference to FIG. 1, a refrigerant pipe 100 of an air conditioner piping system according to an embodiment of the disclosure may be entirely made of a plastic material.

The refrigerant pipe may, for example, connect a compressor and an expansion valve, which are components constituting an air conditioner system of a vehicle or connect an expansion valve and a condenser. In this case, the refrigerant pipe 100 of the air conditioner piping system may include a refrigerant pipe 100a for connecting the compressor and the expansion valve and a refrigerant pipe 100b for connecting the condenser and the expansion valve, and the two refrigerant pipes 100a and 100b may be formed in the same structure, only different in diameter and length.

With reference to FIG. 5, the refrigerant pipe 100 according to an embodiment of the disclosure may be, for example, formed in a multi-layered piping structure including an outer layer 101 and an inner layer 102.

For example, the outer layer 101 of the refrigerant pipe 100 may be made of a polyamide 6 (PA 6) material, and the inner layer 102 of the refrigerant pipe 100 may be made of a polyamide 612 (PA 612) material.

Polyamide 6 and polyamide 612 are engineering plastics made of aliphatic polyamide materials.

In this case, polyamide 6 has a property of high tensile strength and impact strength, low chemical resistance and high moisture absorption, and polyamide 612 has a property of a high heat deformation temperature of 190° C. or higher, high flame retardance, toughness, and chemical resistance, and low water absorption.

A polyamide 6 material is a material with high physical rigidity and low electrical conductivity, and in the case that the outer layer 101 is made of polyamide 6 material, the rigidity of the refrigerant pipe 100 against external factors receiving from the outside may be increased, and electrical insulation thereof may be improved.

A polyamide 612 material is a material with low permeability to the refrigerant, and in the case that the inner layer 102 is made of the polyamide 612 material, a refrigerant flowing into the refrigerant pipe 100 may be prevented from being penetrated to the outside.

As a refrigerant used in a vehicle air conditioner system, a Freon-based refrigerant may be used, for example, refrigerants R-12 and R-22 may be used, but it should be noted that the disclosure is not limited thereto.

The refrigerant pipe 100 according to an embodiment of the disclosure is connected to enable the flow of the refrigerant to components constituting the air conditioner system through a connection flange 110 made of a plastic material, as shown in FIG. 1.

More specifically, the connection flange 110 connects the refrigerant pipe 100, the compressor, the expansion valve, and the condenser.

Accordingly, the compressor, the condenser, the expansion valve, and the evaporator, which are components constituting the air conditioner system, are connected by the refrigerant pipe 100 and the connection flange 110 made of a plastic material to form one refrigerant circulation circuit.

According to an embodiment of the disclosure shown in FIG. 1, a charging port 120 for connecting with a component charging an insufficient refrigerant into the refrigerant pipe 100 may be coupled to the upper side of an outer circumferential surface of the refrigerant pipe 100, and the charging port 120 may be made of a plastic material. For example, the charging port 120 may be provided with a charging valve (not illustrated) for charging a refrigerant into the refrigerant pipe 100. The charging port 120 according to an embodiment of the disclosure will be described in detail below.

The refrigerant piping system according to the disclosure may reduce a weight of the entire air conditioning system compared to the refrigerant pipe made of a conventional aluminum material by producing the refrigerant pipe 100, the connection flange 110, and the charging port 120 connecting various components constituting the air conditioner system with a plastic material.

Further, by producing the refrigerant pipe 100, the connection flange 110, and the charging port 120 with a plastic material, the effect of self-isolating driving and engine vibration may be improved.

In the case that the refrigerant pipe, the connection flange 110, and the charging port 120 are made of an aluminum material as in the prior art, in order to reduce driving and engine vibration, by connecting and using a vibration isolation hose, which is a separate component to an aluminum pipe, there is a problem that the number of components and cost increase.

However, as in this embodiment, by producing the refrigerant pipe 100, the connection flange 110, and the charging port 120 with a plastic material, separate components for driving and engine vibration reduction are not required; thus, the number of the components and cost can be reduced.

According to an embodiment of the disclosure, in a state in which the refrigerant pipe 100 is press-fitted to the connection flange 110, bonding between the connection flange 110 and the refrigerant pipe 100, and bonding between the charging port 120 and the refrigerant pipe 100 in a state in which the charging port 120 is seated in an upper portion of the refrigerant pipe 100 may be made by a laser welding method of welding using a heat by laser energy.

In this case, it is preferable that the refrigerant pipe 100 is made of a laser-absorbing plastic material to which a laser-absorbing pigment capable of absorbing laser beam energy during laser welding is added and that the connection flange 110 and the charging port 120 are made of a transmissive plastic material to which a laser transmissive pigment that may penetrate laser beam energy is added.

According to an embodiment of the disclosure, in a process of producing the refrigerant pipe 100 with a laser-absorbing plastic material, a filler (chemical for improving processability or extrudability by a polymer chain) may be added to a plastic material so as to facilitate processing and extrusion molding of the refrigerant pipe 100.

When an added amount of the filler is large, extrusion moldability is good but heat resistance is poor; thus, a filler content is minimized so that the extruded refrigerant pipe 100 absorbs a heat of laser energy and has heat resistance.

Further, the refrigerant pipe 100 may add a carbon black pigment, which is a laser absorbing pigment or a dye material.

According to an embodiment of the disclosure, in a process of producing the connection flange 110 and the charging port 120 with a laser-transmissive plastic material, a carbon black pigment that affects an amount of laser transmission may be excluded from a plastic material for producing the connection flange 110 and the charging port 120, and a dark blue pigment or a white blue pigment, which is a pigment or dye material capable of laser transmission, may be added to the plastic material.

In a state in which one end portion of the refrigerant pipe 100 is press-fitted into the connection flange 110 and in which the charging port 120 is coupled to the refrigerant pipe 100, laser beam energy radiated from the outside of the connection flange 110 or the charging port 120 is absorbed into the refrigerant pipe 100 through the connection flange 110 and the charging port 120.

Accordingly, thermal bonding according to laser welding between the refrigerant pipe 100 and the connection flange 110 or the refrigerant pipe 100 and the charging port 120 is made.

In this case, when laser beam energy penetrates the connection flange 110 and the charging port 120 made of a laser-transmissive plastic material, and then is absorbed to the refrigerant pipe 100 made of a laser-absorbing plastic material, the laser beam energy activates molecules in an absorption layer, a heat generated by kinetic energy of the activated molecules melts the connection flange 110 and the charging port 120; thus, the refrigerant pipe 100, the connection flange, and the charging port 120, which are two base materials are thermally bonded.

In this way, by bonding the refrigerant pipe 100, the connection flange 110, and the charging port 120 of a plastic material to each other by a laser welding method using a heat by laser energy, the refrigerant pipe 100, the connection flange 110, and the charging port 120 may be strongly coupled to each other without any damage (occurring deformation, step, perforation, and the like).

That is, due to an impact when connecting a refrigerant pipe and a flange made of an aluminum material with a caulking method or a brazing method in the prior art, quality defects such as deformation, step, and perforation occurred in a connection part between the refrigerant pipe 100 and the flange, but in the disclosure, by bonding the refrigerant pipe 100, the connection flange 110, and the charging port 120 of a plastic material to each other by a laser welding method using a heat by laser energy, the refrigerant pipe 100, the connection flange 110, and the charging port 120 may be strongly coupled to each other without any damage and defects (occurring deformation, step, perforation, and the like).

Further, as the refrigerant pipe 100, the connection flange 110, and the charging port 120 are bonded to each other without any damage by a laser welding method, a diameter of the entire length of the refrigerant pipe 100 is maintained at the same diameter; thus, a pressure loss of a refrigerant fluid may be minimized.

The connection flange 110 and the charging port 120 of the air conditioner piping system according to an embodiment of the disclosure may be produced by attaching a thermal stabilizer.

More specifically, an external appearance color of the connection flange 110 and the charging port 120 may be discolored over time.

When the external appearance of the connection flange 110 and the charging port 120 is discolored, an aesthetic problem occurs. Therefore, in order to prevent the external appearance of the connection flange 110 and the charging port 120 from being discolored, it is preferable to produce the charging port 120 by attaching a thermal stabilizer.

As the heat stabilizer, for example, amine-based, organotin-based, carboxylate metal salt-based, lead-based, epoxy-based, and organic phosphite-based heat stabilizers may be used, but it should be noted that the disclosure is not limited thereto.

With reference to FIGS. 2 to 5, the charging port 120 according to an embodiment of the disclosure is a component for connecting a charging valve (not illustrated) for injecting a refrigerant into the refrigerant pipe 100 through a refrigerant injection hole 103 formed in the refrigerant pipe 100.

As shown in FIG. 5, the charging port 120 may include a main body 121 provided with a refrigerant moving space 121*a* communicating with the refrigerant injection hole 103 and a fixing part 122 extended to the lower end side of the main body 121 to couple the main body 121 to an outer circumferential surface of the refrigerant pipe 100.

The fixing part 122 according to an embodiment of the disclosure is formed to be coupled except for a portion of the lower side of the outer circumferential surface of the refrigerant pipe 100, and when the fixing part 122 is coupled to the outer circumferential surface of the refrigerant pipe, a thickness t thereof may be formed to decrease from the upper end side to the lower end side so that an elastic restoring force is flexibly generated.

In the case that a thickness t of the fixing part 122 is uniformly formed, when the fixing part 122 of the charging port 120 is coupled to the outer circumferential surface of the refrigerant pipe 100, in order to generate an elastic restoring force in a second area 122*b* of the fixing part to be described later, a strong force acts; thus, there is a problem that the fixing part 122 may be damaged. In order to solve this problem, it is preferable to form the fixing part 122 to decrease a thickness t from the upper end side to the lower end side so that an elastic restoring force is flexibly generated in the fixing part 122.

The fixing part 122 may include a first area 122*a* and a second area 122*b* as shown in FIGS. 2-4.

As illustrated in FIGS. 3 and 4, the first area 122*a* of the fixing part 122 may be formed in a semicircular shape at the lower end side of the main body 121 and be an area that may be seated at the upper side based on a central axis line C of the refrigerant pipe 100.

The second area 122*b* of the fixing part 122 may be extended from both sides of the first area 122*a* toward the lower side based on the central axis line C of the refrigerant pipe 100 and be an area that may be formed to support while enclosing a portion of the lower side of the refrigerant pipe 100 by an elastic restoring force. Such a second area 122*b* may enable an inner side surface of the first area 122*a* to be seated in close contact with an outer circumferential surface of the refrigerant pipe 100 while restricting a movement of the first area 122*a* in a state in which the first area 122*a* of the fixing part 122 is seated in the upper side of the central axis line C of the refrigerant pipe 100.

For example, in the case that the fixing part 122 of the charging port 120 is formed with only the first area 122*a*, due to production tolerances generated in a producing process of the refrigerant pipe 100, a minute gap is generated between the outer circumferential surface of the refrigerant pipe 100 and the first area 122*a* of the fixing part 122 seated at the outer circumferential surface of the refrigerant pipe 100; thus, a bonding defect occurs therebetween.

In this case, as the second area 122*b* supports in a state enclosing a portion of the lower side of the refrigerant pipe 100 by an elastic restoring force generated in a process in which the fixing part 122 is coupled to the refrigerant pipe 100, while the first area 122*a* of the fixing part 122 is prevented from being moved in a state seated in the refrigerant pipe 100, the first area 122*a* may be seated in a close contact state with the outer circumferential surface of the refrigerant pipe 100.

With reference to FIG. 6, a refrigerant piping system according to an embodiment of the disclosure may further include a positioning means or positioner 130 for easily matching a position of the refrigerant injection hole 103 formed in the refrigerant pipe 100 and a position of the refrigerant moving space 121*a* formed in the main body 121 when the charging port 120 is coupled to an upper portion of the refrigerant pipe 100.

The positioning means 130 may include at least one positioning protrusion 131 protruded from an outer circumferential surface of the refrigerant pipe 100 toward the fixing part 122 and at least one positioning groove 132 formed at a lower surface of the fixing part 122 and to which the positioning protrusion 131 is coupled. The positioning protrusion 131 may be formed in the fixing part 122, and the positioning groove 132 may be formed in the refrigerant pipe 100.

Figure 7:
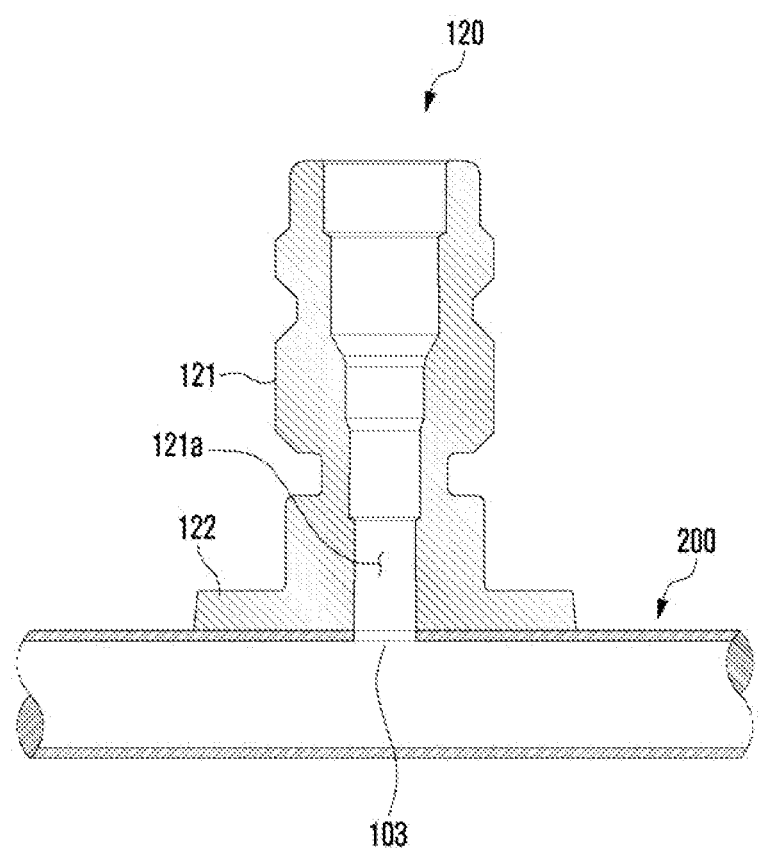
FIG. 7 is a cross-sectional view schematically illustrating a state in which a refrigerant pipe having a single-layer tube structure is applied as another example of a refrigerant pipe according to an embodiment of the disclosure.

FIG. 7 is a cross-sectional view schematically illustrating a state in which a refrigerant pipe having a single-layer tube structure is applied as another example of a refrigerant pipe according to an embodiment of the disclosure.

With reference to FIG. 7, as another example of the refrigerant pipe according to an embodiment of the disclosure, a refrigerant pipe 200 having a single-layer structure may be applied instead of the refrigerant pipe 100 having the above-described multi-layer structure.

Hereinafter, as described above, a method of producing an air conditioner piping system according to an embodiment of the disclosure will be described.

Figure 8:
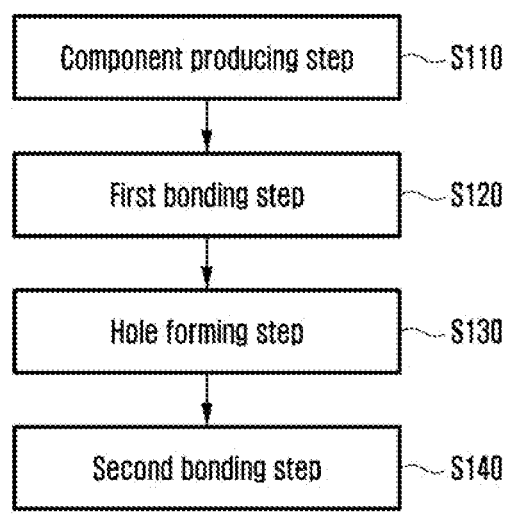
FIG. 8 is a block diagram sequentially illustrating a production process of a refrigerant piping system according to an embodiment of the disclosure.

FIG. 8 is a block diagram illustrating a production process of a refrigerant piping system according to an embodiment of the disclosure.

With reference to FIG. 8, the air conditioner piping system according to an embodiment of the disclosure may include component producing step (S110), first bonding step (S120), hole forming step (S130), and second bonding step (S140).

First, in the component producing step (S110), a process of producing each of the refrigerant pipe 100, the connection flange 110, and the charging port 120 is performed using a plastic material.

In this case, in the component producing step (S110), in order to prevent the connection flange 110 and the charging port 120 from being discolored, a thermal stabilizer may be added to the connection flange 110 and the charging port 120.

Further, in the component producing step (S110), the refrigerant pipe may be made of a laser-absorbing plastic material, and the connection flange 110 and the charging port 120 may be made of a laser-transmissive plastic material.

Further, the refrigerant pipe 100 in the component producing step (S110) may be produced in a multi-layered piping structure including the outer layer 101 and the inner layer 102.

Thereafter, in the first bonding step 120, after the connection flange 110 is coupled to at least one end side of the refrigerant pipe 100, a process of bonding the connection flange 110 and the refrigerant pipe 100 to each other by laser welding using a laser device (not illustrated) is performed.

In this case, when a laser beam is radiated to the connection flange 110 side coupled to the refrigerant pipe 100 using a laser device, laser beam energy penetrates the connection flange 110 made of a laser-transmissive plastic material.

Therefore, laser beam energy is absorbed to the refrigerant pipe 100 made of a laser-absorbing plastic material to activate molecules in an absorption layer, and a heat generated by kinetic energy of the activated molecules melts the connection flange 120; thus, the refrigerant pipe 100 and the connection flange 120 are thermally bonded to each other.

Thereafter, in the hole forming step (S130), a process of forming the refrigerant injection hole 103 on the outer circumferential surface of the refrigerant pipe 100 using a drilling device (not illustrated) is performed.

Thereafter, in the second bonding step (S140), after the fixing part 122 of the charging port 120 is coupled at a position in which the refrigerant injection hole 103 of the refrigerant pipe 100 is formed, a process of bonding the charging port 120 and the refrigerant pipe 100 to each other by laser welding using a laser device (not illustrated) is performed.

In this case, while a positioning protrusion 131 formed at the outer circumferential surface of the refrigerant pipe 100 is coupled to a positioning groove 132 formed in the fixing part 122 of the charging port 120, the charging port 120 is seated in close contact with the outer circumferential surface of the refrigerant pipe 100 using an elastic restoring force of the fixing part 122.

Thereafter, when a laser beam is radiated to the fixing part 122 side of the charging port 120 using a laser device, laser beam energy penetrates the fixing part 122 of the charging port 120 made of a laser-transmissive plastic material.

Therefore, the laser beam energy is absorbed to the refrigerant pipe 100 made of a laser-absorbing plastic material to activate molecules in the absorption layer, and a heat generated by kinetic energy of the activated molecules melts the charging port 120; thus, the charging port 120 is thermally bonded to the outer circumferential surface of the refrigerant pipe 100.

An air conditioner piping system according to an embodiment of the disclosure is produced through the process as described above.

As described above, in an air conditioner piping system and a method of producing the same according to the disclosure, by producing a refrigerant pipe, a connection flange, and a charging port with a plastic material, the overall weight of the air conditioner system can be reduced and driving and engine vibration can be isolated by itself.

Further, by bonding the refrigerant pipe, the connection flange, and the charging port of a plastic material to each other by a laser welding method using a heat by laser energy, the refrigerant pipe, the connection flange, and the charging port can be strongly coupled to each other without any damage (occurring deformation, step, perforation, and the like).

Further, as the refrigerant pipe, the connection flange, and the charging port are bonded to each other without any damage by a laser welding method, a diameter of the entire length of the refrigerant pipe is maintained at the same diameter, thereby minimizing a pressure loss of a refrigerant fluid.

Further, by producing the refrigerant pipe in a multi-layered pipe structure including an outer layer and an inner layer, a refrigerant flowing inside the refrigerant pipe is prevented from being penetrated to the outside, and the rigidity and electrical insulation of the refrigerant pipe against external factors receiving from the outside can be improved.

Further, as the charging port and the refrigerant pipe are bonded in a state in which the charging port is seated in the refrigerant pipe using a fixing part thereof, the charging port can be simply coupled to an upper portion of the refrigerant pipe.

Further, as the fixing part of the charging port is produced to provide an elastic restoring force, the refrigerant pipe and the charging port can be coupled so that a gap does not occur therebetween, thereby preventing bonding defects therebetween.

Through an air conditioner piping system according to the disclosure, the disclosure can provide the following effects.

An air conditioner piping system and a method of producing the same according to the disclosure can provide the effect of self-isolating driving and engine vibration as well as reducing a weight of the entire air conditioner system by producing a refrigerant pipe, a connection flange, and a charging port with a plastic material.

Further, an air conditioner piping system and a method of producing the same according to the disclosure can provide an effect that a refrigerant pipe, a connection flange, and a charging port can be strongly coupled to each other without any damage (occurring deformation, step, perforation, and the like) by bonding the refrigerant pipe, the connection flange, and the charging port of a plastic material to each other by a laser welding method using a heat by laser energy.

Further, an air conditioner piping system and a method of producing the same according to the disclosure can provide an effect capable of minimizing a pressure loss of a refrigerant fluid by maintaining a diameter of an entire length of the refrigerant pipe at the same diameter, as the refrigerant pipe, the connection flange, and the charging port are bonded to each other without any damage by a laser welding method.

Further, an air conditioner piping system and a method of producing the same according to the disclosure can provide an effect capable of preventing a refrigerant flowing into a refrigerant pipe from being penetrated to the outside and improving rigidity and electrical insulation against external factors in which the refrigerant pipe receives from the outside by producing the refrigerant pipe in a multi-layered piping structure including an outer layer and an inner layer.

Further, an air conditioner piping system and a method of producing the same according to the disclosure can have an effect that can simply couple a charging port to an upper portion of the refrigerant pipe by bonding the charging port and the refrigerant pipe in a state in which the charging port is seated in the refrigerant pipe using a fixing part thereof.

Further, an air conditioner piping system and a method of producing the same according to the disclosure can provide an effect capable of preventing a bonding defect between the refrigerant pipe and the charging port by coupling the refrigerant pipe and the charging port so that a gap is not generated between the refrigerant pipe and the charging port by producing a fixing part of the charging port so that an elastic restoring force is provided.

Although the disclosure has been described with reference to embodiments, the disclosure is not necessarily limited thereto, and modifications and variations are possible within the scope of the technical spirit of the disclosure.

DESCRIPTION OF SYMBOLS

100: refrigerant pipe
101: outer layer
102: inner layer
103: refrigerant injection hole
110: connection flange
120: charging port
121: main body
121a: refrigerant movement space
122: fixing part
122a: first area
122b: second area 130: positioning means or positioner
131: positioning projection
132: positioning groove

We claim:

1. An air conditioning piping system, comprising:
a refrigerant pipe made of a plastic material and configured to provide a fluid flow between components constituting an air conditioning system;
a connection flange made of the plastic material and configured to provide a connection between the refrigerant pipe and components constituting the air conditioning system; and
a charging port made of the plastic material and comprising a charging valve configured to inject a refrigerant into the refrigerant pipe;
wherein the connection flange is bonded to the refrigerant pipe by laser welding in a state in which one side end portion of the refrigerant pipe is coupled, and the charging port is bonded to the refrigerant pipe by laser welding in a state seated at an upper side of an outer circumferential surface of the refrigerant pipe;
the charging port comprises:
a main body in which a refrigerant moving space communicating with a refrigerant injection hole formed in the refrigerant pipe is provided and the charging valve configured to inject the refrigerant into the refrigerant injection hole is disposed; and
a fixing part extended to a lower end side of the main body to couple the main body to the outer circumferential surface of the refrigerant pipe, wherein the fixing part is formed to be coupled to the refrigerant pipe except for a portion of a lower side of the outer circumferential surface of the refrigerant pipe, and when the fixing part is coupled to the outer circumferential surface of the refrigerant pipe, a thickness thereof is formed to decrease from an upper end side of the main body to the lower end side of the main body so as to flexibly generate an elastic restoring force;
the air conditioning piping system further comprising a positioner configured to match a position of the refrigerant injection hole and a position of the refrigerant movement space when the fixing part is coupled to the upper side of the outer circumferential surface of the refrigerant pipe;
wherein the positioner comprises:
a positioning protrusion protruded from the outer circumferential surface of the refrigerant pipe toward the fixing part; and
a positioning groove formed concavely at a lower surface of the fixing part and to which the positioning protrusion is coupled.

2. The air conditioning piping system of claim 1, wherein the fixing part comprises:
a first area formed in a semicircular shape at the lower end side of the main body and seated in the upper side based on a central axis line of the refrigerant pipe; and
a second area roundly extended from two sides of the first area toward the lower side of the outer circumferential surface of the refrigerant pipe based on the central axis line and supporting while enclosing a portion of the lower side of the outer circumferential surface of the refrigerant pipe by an elastic restoring force.

3. The air conditioning piping system of claim 1, wherein the refrigerant pipe is made of a laser-absorbing plastic material, and the connection flange and the charging port are made of a laser-transmissive plastic material.

4. The air conditioning piping system of claim 3, wherein coupling between the refrigerant pipe and the charging port is performed by bonding by laser welding between the refrigerant pipe and the charging port, as laser energy penetrated and radiated from an outside of the charging port penetrates the fixing part, and then is absorbed into the refrigerant pipe in a state in which the fixing part of the charging port is mounted at the upper side of the outer circumferential surface of the refrigerant pipe.

5. The air conditioning piping system of claim 1, wherein the refrigerant pipe is formed in a multi-layered pipe structure comprising an outer layer and an inner layer.

6. The air conditioning piping system of claim 5, wherein the outer layer of the refrigerant pipe is made of a polyamide 6 (PA6) material, and the inner layer of the refrigerant pipe is made of a polyamide 612 (PA612) material.

7. The air conditioning piping system of claim 1, wherein a thermal stabilizer is added to the connection flange and the charging port in order to prevent the connection flange and the charging port from being discolored.

8. A method of producing an air conditioner piping system, wherein the air conditioner pipe system comprises:
a refrigerant pipe made of a plastic material and configured to provide a fluid flow between components constituting an air conditioner system;
a connection flange made of the plastic material and configured to provide a connection between the refrigerant pipe and components constituting the air conditioner system; and
a charging port made of the plastic material and comprising a charging valve configured to inject a refrigerant into the refrigerant pipe;
wherein the connection flange is bonded to the refrigerant pipe by laser welding in a state in which one side end portion of the refrigerant pipe is coupled, and the charging port is bonded to the refrigerant pipe by laser welding in a state seated at an upper side of an outer circumferential surface of the refrigerant pipe;
the charging port comprises:
a main body in which a refrigerant moving space communicating with a refrigerant hole formed in the refrigerant pipe is provided and the charging valve configured to inject the refrigerant into the refrigerant injection hole is disposed; and
a fixing part extended to a lower end side of the main body to couple the main body to the outer circumferential surface of the refrigerant pipe, wherein the fixing part is formed to be coupled to the refrigerant pipe except for a portion of a lower side of the outer circumferential surface of the refrigerant pipe, and when the fixing part is coupled to the outer circumferential surface of the refrigerant pipe, a thickness thereof is formed to decrease from an upper end side of the main body to the lower end side of the main body so as to flexibly generate an elastic restoring force;
the air conditioner piping system further comprising:
a positioner configured to match a position of the refrigerant injection hole and a position of the refrigerant movement space when the fixing part is coupled to the upper side of the outer circumferential surface of the refrigerant pipe;
wherein the positioner comprises:
a positioning protrusion protruded from the outer circumferential surface of the refrigerant pipe toward the fixing part; and a positioning groove formed concavely at a lower surface of the fixing part and to which the positioning protrusion is coupled;

the method comprising:
producing each of the refrigerant pipe, the connection flange, and the charging port using the plastic material;

coupling the connection flange to at least one end side of the refrigerant pipe and then bonding the refrigerant pipe and the connection flange to each other by laser welding using a laser device;

forming the refrigerant injection hole on the outer circumferential surface of the refrigerant pipe using a drilling device; and coupling the fixing part of the charging port at a position in which the refrigerant injection hole of the refrigerant pipe is formed, and then bonding the refrigerant pipe and the connection flange to each other by the laser welding using the laser device;

wherein the coupling the fixing part comprises determining a bonding position of the positioning protrusion formed in the refrigerant pipe and the positioning groove formed in the fixing part by inserting the positioning protrusion into the positioning groove.

9. The method of claim 8, wherein the producing comprises adding a thermal stabilizer to the connection flange and the charging port in order to prevent the connection flange and the charging port from being discolored.

10. The method of claim 8, wherein the refrigerant pipe is made of a laser-absorbing plastic material, and the connection flange and the charging port are made of a laser-transmissive plastic material.

* * * * *